United States Patent Office 2,877,195
Patented Mar. 10, 1959

2,877,195

VINYLATE FATTY ACID ESTERS

John W. McNabb, Huntington Station, N. Y., assignor of one-half to American Can Company, New York, N. Y., a corporation of New Jersey, and one-half to Kienle and Company, Brooklyn, N. Y., a corporation of New York No Drawing. Original application May 19, 1952, Serial No. 288,758. Divided and this application April 29, 1954, Serial No. 426,593

6 Claims. (Cl. 260—23)

This is a division of my application Serial No. 288,758, filed May 19, 1952, now U. S. Patent No. 2,689,834.

This invention relates to copolymers of vinyl compounds and resinous esters of polymeric polyhydric alcohols and more particularly has reference to copolymers of vinyl compounds, resinous polyphenylether alcohols and unsaturated monobasic organic acids.

An object of the invention is the provision of new and novel copolymers of vinyl compounds, resinous polyphenylether alcohols and unsaturated monobasic acids, their method of preparation and articles coated with the copolymers.

Another object is the provision of copolymers of vinyl compounds, resinous polyphenylether alcohols and unsaturated monobasic organic acids, which copolymers are characterized by vastly improved steam, water, and alkali resistance, excellent flexibility of dried films, and exceptional adhesive qualities.

Another object is the provision of new organic coating compositions that are especially useful for application to metal surfaces, such as tin plate, black iron plate, tern plate, aluminum plate, etc. used in the manufacture of metal containers.

Numerous other objects and advantages of the invention will be apparent as it is better understood from the following description which is of a preferred embodiment thereof.

These objects are accomplished by forming a copolymer comprising an aliphatic vinyl compound, a resinous alcohol formed by reacting a polyphenol with an epihalohydrin or a polyepoxy compound and a monobasic, unsaturated carboxylic acid having from 12 to 22 carbon atoms.

Dried films of my copolymers have properties that are considerably different from those of polymers formed from the individual reactants. For example, polymers of aliphatic vinyl compounds such as polyvinyl chloride, copolymers of vinyl chloride and vinyl acetate, polyvinyl acetate, polyvinyl alcohol and the methacrylate ester polymers, either decompose on heating to high temperatures or soften to such an extent that their use on metal containers is limited to cans which are not intended to receive a high heat treatment after fabrication. Other shortcomings of the individual polymers are generally well known to those familiar with the metal can manufacturing art. Polymers of aromatic vinyl compounds, such as polystyrene, have poor adhesive qualities, are excessively softened by temperature to which containers are frequently exposed and usually produce films that are too inflexible for general use on containers. It is usually very difficult to produce desired characteristics in a coating material containing vinyl polymers because of the very limited compatibility of these polymers with modifying ingredients.

Varnishes made from drying and semi-drying oils have very low alkali and fat resistance.

Polymers formed by reacting a polyphenol with an epihalohydrin, in accordance with the teachings of Patent 2,324,483 or polyepoxy compounds, as described in Patent 2,503,726, are thermosetting and become too brittle for use in container manufacture. For the purpose of brevity the resins of the type described in these two patents are herein after referred to as "resinous polyphenylether alcohols."

Patent 2,456,408 discloses fatty acid esters of resinous polyphenylether alcohols, and includes esters of unsaturated carboxylic acids. These polymers are not sufficiently heat or fat resistant for use in packing fat containing products such as meats. Polymers of unsaturated acids of the type described in this patent are useful, however, as starting materials for my new compositions.

There is no film-forming material at present that has general usefulness for coating sheet metal that is to be fabricated into containers. It is common knowledge that a great variety of products having widely divergent characteristics are packaged in metal containers, and the characteristics of the product, or the treatment to which the container is subjected after packing, usually dictates the type of protective layer used on the metal. Thus, the coating materials that are tailored for one group of products are totally unfit for another series of products. My compositions can be used as either an inside or outside coating for packaging products that are quite alkaline, that contain large amounts of fat, or are given a severe heat treatment after packing.

There are at least three broad methods for preparing my new and novel compositions. In one process I first esterify a resinous polyphenylether alcohol with an unsaturated aliphatic acid and then react the polyester thus formed with a vinyl monomer. In the second method I partially esterify a resinous polyether alcohol with an unsaturated aliphatic acid, then vinylate the partial ester and thereafter complete the esterification reaction. The third general procedure is to first react the unsaturated aliphatic acid with a vinyl monomer, and then esterify the vinylated acid with the polyphenylether alcohol.

The examples of my compositions and their methods of preparation which follow are intended to exemplify, but not to limit, my invention.

A. RESINOUS POLYPHENYLETHER ALCOHOLS

Resinous polyphenylether alcohols can be prepared in accordance with the following general reaction:

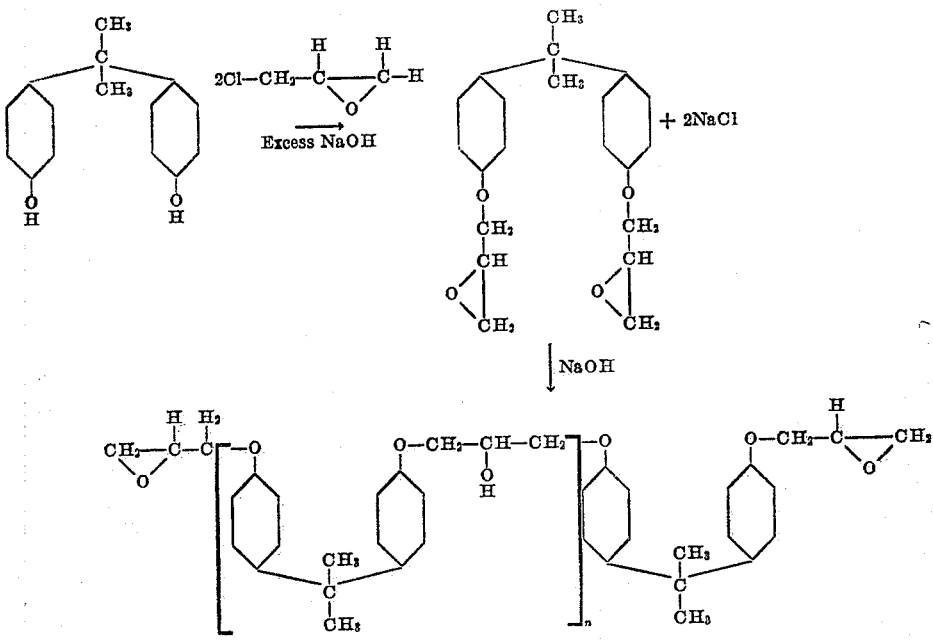

2,2-bis-(p-hydroxyphenyl) propane (commonly termed Bisphenol A) is reacted with at least 2 molar equivalents of an epihalohydrin, such as epichlorohydrin, in the presence of an excess of alkali to form an epoxy ether derivative of the bisphenol. The epoxy ether derivative is polymerized under the influence of heat and alkali to produce a resinous material having a multiplicity of aliphatic secondary hydroxyl groups and terminal epoxy groups. Resinification of the epoxy ether derivative of the bisphenol can be effected without isolating the monomer by maintaining the alkali concentration at a catalytic level and heating the reaction products. The polymer is a resinous polyphenylether alcohol having a series of alternating aromatic nuclei substantially free of unreacted hydroxyl groups connected to alternate aliphatic chains through ether linkages. In this example the aromatic nucleus is the bisphenol part of the molecule. Each aliphatic ether chain contains at least one hydroxyl or epoxy group as the sole reactive group. In the resinous polyphenylether alcohol the letter $n$ represents an integer not less than 1. Resins of this type are available commercially from Shell Chemical Company under the name of Epon resins. The resin need not be the reaction product of Bisphenol A and epichlorohydrin. Other resins of this same genus described in Patents 2,324,483 and 2,503,726 can be substituted.

B. ESTERS OF RESINOUS POLYPHENYLETHER ALCOHOLS

In this and subsequent examples, the portions specified are by weight, unless otherwise designated.

B1. Ingredient: Parts by weight
Resinous polyphenylether alcohol [1] _____ 696
Dehydrated castor oil acids [2] _____ 1120

[1] The resinous polyphenylether alcohol was a reaction product of 2,2 bis-(p-hydroxyphenyl) propane and epichlorohydrin. It had a molecular weight of 1400–1600, a melting point of 97–103° C., as calculated by Durran's mercury method and an epoxide equivalent of 705–985. Epoxide equivalent equals the grams of resin containing an equivalent of epoxide.
[2] The fatty acids had an equivalent weight of 280. It was calculated that 174 parts of resin were required for each 280 parts of acid for complete esterification.

These materials were charged into a flask and heated to 245° C. under a blanket of inert gas until a constant acid value was reached. This took about 4 hours for completion. The water of esterification was removed by entrapment in a Stark and Dean unit attached to a condenser. The cooled product has an acid value of 30, a Gardner (1933) color of 5.5 in a 75% solids solution in Solvesso 150, a Gardner-Holdt viscosity of Z–3 to Z–4 in the same solution, and a refractive index of 1.5250. In all subsequent examples the viscosity was determined by the Gardner-Holdt method, and the color was graded in accordance with Gardner 1933 standards.

B2. A similar esterification procedure was followed with the same unsaturated fatty acids as in B1 above and a polyphenylether alcohol resin having a molecular weight of 850–950, a melting point of 64–76° C. and an epoxide equivalent of 450–525. It was calculated that 132 parts of resin were required for each 280 parts of acids for complete esterification.

Ingredient: Parts by weight
Resinous polyphenylether alcohol _____ 528
Dehydrated castor oil acids _____ 1120

The reaction was considered complete after four hours at 245° C. The cooled polyester had an acid value of 35.1, a color of 7.5 as determined from a 75% solution in Solvesso 150 and a viscosity of W in the same solution, and a refractive index of 1.5146.

It is to be understood that other monobasic, unsaturated aliphatic, or aralkyl acids may be substituted for the dehydrated castor oil acids. The unsaturation can be conjugated or non-conjugated. Specific examples are oiticica, soybean, cotton seed, linseed, tung, or other unsaturated vegetable or animal fatty acids. Unsaturated, monobasic fatty acids having from 12 to about 22 carbon atoms can be used.

C. INTERPOLYMER

In the examples which follow, the resinous polyester formed by reacting dehydrated castor oil acids with a resinous polyphenylether alcohol formed by reacting Bisphenol A and epichlorohydrin was employed. The resin was dissolved in a relatively inert solvent, Solvesso 150, in a four-necked flask fitted with a variable speed mechanical stirrer, a thermometer, a Stark and Dean trap to which a water cooled condenser was attached, and feeding means for adding dropwise a vinyl compound mixed with a polymerization catalyst.

Example 1

| | |
|---|---|
| Resinous polyester described under B1 | 750 |
| Inert solvent | 1500 |
| Monomeric methyl methacrylate | 375 |
| Alpha pinene | 37.5 |
| Ditertiary butyl peroxide | 11.25 |

The solution of polyester was heated to 100° C. and a mixture of vinyl monomer, alpha pinene and catalyst was added dropwise over a period of 2½ hours. The temperature during this period was maintained at 97–100° C. and held there for an additional eleven hours. The unreacted monomer was distilled off and the solution was allowed to cool slowly to room temperature. The solution was clear and homogeneous. It had a non-volatile content of 44%, a viscosity of W, a color of 5.5 and an acid value based on non-volatile material of 16.8.

Example 2

| | |
|---|---|
| Resinous polyester described under B2 | 750 |
| Inert solvent | 1500 |
| Monomeric methyl methacrylate | 375 |
| Alpha pinene | 37.5 |
| Ditertiary butyl peroxide | 11.25 |

The vinyl monomer, alpha pinene and catalyst mixture was added over a period of 3½ hours and the reaction was continued for an additional twelve hours at a temperature of 100–105° C. The unreacted monomer was removed by distillation. By calculation, it was found that 73.33% of the methyl methacrylate reacted. The final solution had a non-volatile content of 40.5%, a viscosity of D-E, a color of 8.5 and an acid number based on the non-volatiles of 29.2, and dried films were clear and homogeneous.

In both of these reactions small amounts, up to 10% of the vinyl monomer, of alpha pinene were used as a "short stop" or polymerization inhibitor to slow down the homopolymerization of the vinyl compound.

Example 3

| | |
|---|---|
| Resinous polyester described under B2 | 500 |
| Inert solvent | 1000 |
| Monomeric n-butyl methacrylate | 250 |
| Ditertiary butyl peroxide | 7.5 |

The homo-polymerization of n-butyl methacrylate is sufficiently slow as to require no polymerization inhibitor. The vinyl monomer and catalyst mixture was added in 2¾ hours, to a solution of the polyester which was held at a temperature of 145° C. This reaction was continued at about the same temperature for an additional 14½ hours, after which the unreacted monomer was removed by distillation. The finished solution had a non-volatile content of 38.5%, a viscosity of A, a color of 6 and an acid number based on the non-volatile of 28.5.

Each of the methacrylate ester copolymers of the polyester of an unsaturated acid when flowed onto tin plate and baked at 300° F. for 15 minutes, formed a continuous film with excellent resistance to alkali and water. The films had exceptional flexibility and adhesion to metal substrates.

In preparing the interpolymer, unsaturated fatty acids having conjugated double bonds can first be reacted with a vinyl monomer and subsequently esterified with a polyphenylether alcohol described under section A herein.

Example 4

| | |
|---|---|
| Dehydrated castor oil fatty acids | 1400 |
| Monomeric n-butyl methacrylate | 1040 |
| Ditertiary butyl peroxide | 31.2 |

The fatty acids were heated to 160° C. and the n-butyl methacrylate and catalyst mixture was added dropwise over a period of three hours. The reaction temperature was maintained over an additional 8¾ hour period, after which the unreacted monomer was distilled from the reaction. About 90.6% of the monomer was reacted. The product had an acid number of 100.5, an equivalent weight of 558, a viscosity of L and a color of 8.5.

Example 5

| | |
|---|---|
| Vinylated fatty acids of Example 4 | 279 |
| Resinous polyether alcohol described under A (molecular weight 1400–1600) | 174 |

This mixture was heated to 230° C. in 30 minutes and held at 220–240° C. for one hour. The resulting polyester had an acid number of 30.2. A 50% solution in Velsicol 45 had a viscosity of W and a color of 11.5.

Example 6

| | |
|---|---|
| Vinylate fatty acids of Example 4 | 279 |
| Resinous polyether alcohol described under A (molecular weight 850–950) | 132 |

The ingredients were blended and heated to 225° C. in 45 minutes. A reaction temperature of 220–240° C. was maintained for an additional 2¼ hours. This polyester had an acid number of 17.1. A 54% solution in Velsicol 45 had a viscosity of T and a color of 11.5.

Unsaturated fatty acids with non-conjugated double bonds do not react readily with vinyl monomers to form homogeneous copolymers. I have found that unsaturated fatty acids having non-conjugated unsaturation can be vinylated to form homogeneous copolymers by adding to the fatty acids from about 0.5 to about 5% by weight, based on the fatty acids, of a monobasic unsaturated carboxylic acid having from 4 to 6 carbon atoms. A vinyl homopolymerization inhibitor may be used in this reaction also. Examples of suitable 4 to 6 carbon atom unsaturated acids are sorbic acid and crotonic acid.

In this process, it is necessary merely to mix the desired amount of 4 to 6 carbon atom monobasic acid with the unsaturated fatty acids having a high percentage of unconjugated unsaturation and proceed with the vinylation and esterification in a manner described previously.

In order to effect a copolymerization between the unsaturated fatty acid radicals of the polyester of the polyphenylether alcohol and a vinyl monomer, it is essential that the polyester be in solution during the reaction period and that the vinyl monomer and catalyst mixture be added slowly, and preferably dropwise, to a hot solution of the polyester.

When the polyphenylether alcohol, unsaturated fatty acid ester, monomeric vinyl compounds and catalyst were blended before the reaction was begun, the resulting film was cloudy, indicating incompatibility. By first preparing a partial ester of the polyphenylether alcohol and unsaturated fatty acids, and adding the vinyl monomer and catalyst dropwise to this partial ester clear films can be produced.

Where solvents are employed, they preferably should have a high proportion of aromatics. Solvents of this type are xylol and those sold under the trade names of Solvesso 100, Solvesso 150 and Velsicol 45. Solvesso 100 has a distillation range of 306° F. to 343° F., aniline point of 12° C., an aromatic content of 95–99.5% and a kauri-butanol value of 90 base on 100 for toluol. Solvesso 150 has a 375° F.–398° F. distillation range, an aniline point of 20.1° C., a kauri-butanol value of about 83 and contains from 90–95% aromatics. Velsicol 45 has a distillation range of 370° F.–540° F., a maximum aniline point of 26° C. and a kauri-butanol value of 90.

Although the amount of inert solvent used is not critical, sufficient solvent should be present to maintain fluidity in the reaction mass and prevent gelation before completion of the reaction.

It is apparent that there are several methods that can be employed to make my new and novel copolymers of vinyl compounds, polyphenylether alcohols and unsaturated fatty acids. This result can be accomplished by first forming a polyester with a resinous polyphenylether alcohol and an unsaturated fatty acid and subsequently treating the polyester with a vinyl monomer and a catalyst.

The unsaturated fatty acids may first be treated with a vinyl monomer and then esterified with a polyphenylether alcohol. Another alternative is to form a partial ester of the unsaturated fatty acids and polyphenylether alcohols, and treat the partial ester with vinyl monomers and then complete the esterification reaction.

In the examples the resinous polyphenylether alcohol is a reaction product of 2,2-bis-(p-hydroxyphenyl) propane and epichlorohydrin. Other resins of this general type can also be used. They can be formed by reacting an epichlorohydrin, or an aliphatic polyepoxy compound with a polyhydric phenol. The polyhydric phenol can have its hydroxyl groups attached to one or to separate benzene rings. The resinous polyphenylether alcohols that result from these reactions usually have terminal epoxy groups. However, the epoxy linkage can be opened to form adjacent aliphatic alcohol groups. The resinous polyphenylether alcohols that can be used are described in United States Patents 2,324,483; 2,444,333; and 2,503,726. Mixtures of resinous polyphenylether alcohols described herein can be employed. These compounds can be characterized by the general formula $(R-O-R'-O-R)_n$ in which R is an esterifiable glyceryl radical, i. e. having hydroxy or epoxy groups attached thereto, R' is the hydrocarbon radical of a polyhydric phenol such ah the phenylene radical from hydroquinone or the 2,2-bis (phenylene) propane radical from Bisphenol A, i. e. 2,2-bis-(4-hydroxyphenyl) propane, and $n$ is not less than 1. It can be readily observed from the above general formula that the esterifiable glyceryl radicals and hydrocarbon radicals occur alternately, being joined through ether oxygen atoms. Resins of the type described above having an average molecular weight of about from 850 to 2500 are especially suitable in the interpolymers of the present invention.

The unsaturated monobasic acids that are useful in preparing my copolymers include fatty acids having conjugated unsaturation and mixtures thereof with fatty acids having non-conjugated unsaturation of plant and animal origin and also synthetic unsaturated fatty acids having unsaturated carbon to carbon linkages in which the only non-carbon substituent on the carbon atom is a hydrogen atom. If it is desired to use fatty acids having non-conjugated unsaturation, this may be accomplished by blending with the fatty acids a catalytic amount, i. e. 0.5 to 5.0% by weight of non-conjugated unsaturated fatty acid, of an unsaturated, monocarboxylic acid such as sorbic acid or crotonic acid. The preferred fatty acids are those having 12 to 22 carbon atoms. Examples of acids having conjugated unsaturation are the acids of tung oil, dehydrated castor oil, and oiticica oil. As non-conjugated unsaturated fatty acid, the acids of soybean oil, linseed oil and cotton seed oil may be used. Mixtures of the various conjugated unsaturated acids may be used and also mixtures of the various non-conjugated unsaturated fatty acids.

The vinyl monomers used for copolymerization with the unsaturated linkage of the fatty acids are aliphatic vinyl compounds. Examples of such compounds are lower molecular weight alcohol esters of acrylic and alkyl substituted acrylic acids. Mixtures of any of the alkyl substituted vinyl compounds can be used.

The vinyl monomers can be characterized by the general formula $CH_2=CR-COOR'$ in which R represents hydrogen or a methyl radical and R' represents an alkyl radical having 1 to 4 carbon atoms.

In carrying out the reactions I prefer to use an amount of resinous polyphenylether alcohol which is greater than that required to esterify the monobasic fatty acid. The amount of vinyl monomer may be as low as 25% and as high as 200% of the polyphenylether alcohol ester of non-vinylated ester forming materials. A range of 25 to about 100% is preferred.

The examples disclosed the use of 3% catalyst based on the vinyl monomers. However, effective results can be produced with a range of from 1 to 10%. Other organic peroxides such as benzoyl peroxide can be substituted for the ditertiary butyl peroxide used in the examples. The preferred catalysts are those which have a boiling point as high or higher than the vinyl monomers.

Vinylation of the unsaturated fatty acids can be effected at atmospheric pressure at temperatures ranging from about 20° C. below the boiling point of the vinyl monomer to the boiling or reflux temperature of the vinyl compound. The reflux temperature of the vinyl monomer is preferred. When the reaction is carried out under pressures greater than atmospheric, a higher vinylation temperature can be used, and the upper limit is not clearly defined.

The esterification reaction can be carried out at temperatures between about 175° C. and 260° C. The preferred range, however is from 220° C. to 240° C.

It is thought that the invention and many of its attendant advantages will be understood from the foregoing description, and it will be apparent that various changes may be made in the matter of the ingredients, their identity and their proportions and in the methods of compounding without departing from the spirit and scope of the invention or sacrificing all of its material advantages, the form hereinbefore described being merely a preferred embodiment thereof.

I claim:

1. An interpolymer comprising the reaction product of (1) a polyester formed of a polyether having an equivalent weight of at least about 132 and having alternately in a chain an esterifiable glyceryl radical and the hydrocarbon radical of a polyhydric phenol, said equivalent weight being the weight of a polyether theoretically needed to completely esterify one mol of a monocarboxylic acid, said radicals being joined through ether oxygen atoms, and 12 to 22 carbon atom fatty acids having conjugated unsaturation, said polyether and said unsaturated fatty acid being combined in an equivalent weight ratio of 1 to 1 based on the hydroxyl groups and carboxyl groups respectively, and (2) an alkyl ester of an acrylic acid selected from the group consisting of acrylic acid and methacrylic acid in which said alkyl group contains 1 to 4 carbon atoms, said reaction product being formed by heating (1) and (2) in the presence of a peroxide catalyst.

2. An interpolymer comprising the reaction product of (1) a polyester formed of an esterifiable glyceryl polyether of 2,2-bis-(4-hydroxy phenyl) propane having an equivalent weight of at least about 132 and having alternately a glyceryl radical and the hydrocarbon radical of the phenol, said radicals joined through ether oxygen atoms, said equivalent weight being the weight of polyether theoretically needed to completely esterify one mol of a monocarboxylic acid, and unsaturated acids selected from the group consisting of dehydrated castor oil acids, oiticica oil acids and tung oil acids, said polyether and said unsaturated acid being combined in an equivalent weight ratio of 1 to 1 based on the hydroxyl groups respectively, and (2) an alkyl ester of an acrylic acid selected from the group consisting of acrylic acid and methacrylic acid in which said alkyl group contains 1 to 4 carbon atoms, said reaction product being formed by heating (1) and (2) in the presence of a peroxide catalyst.

3. The interpolymer of claim 1 in which the fatty acids are selected from the group consisting of dehydrated castor oil acids, oiticica oil acids, and tung oil acids.

4. The interpolymer of claim 2 in which the unsaturated acids are dehydrated castor oil acids.

5. The interpolymer of claim 2 in which the alkyl ester of an acrylic acid is methyl methacrylate.

6. The interpolymer of claim 2 in which the alkyl ester of an acrylic acid is n-butyl methacrylate.

References Cited in the file of this patent

UNITED STATES PATENTS 2,684,345     Yuska et al. _____ July 20, 1954

OTHER REFERENCES

Grant: Hackh's Chemical Dictionary, third edition (1944), Blakiston Co., page 17.